(12) United States Patent
Hirota

(10) Patent No.: US 7,616,246 B2
(45) Date of Patent: Nov. 10, 2009

(54) SOLID-STATE IMAGING DEVICE WITH ENHANCED PIXEL THINNING OUT CONFIGURATION, METHOD FOR DRIVING SAME, AND IMAGE APPARATUS INCORPORATING SAME

(75) Inventor: Isao Hirota, Kanagawa (JP)

(73) Assignee: Sony Corporation, Tokyo (JP)

( * ) Notice: Subject to any disclaimer, the term of this patent is extended or adjusted under 35 U.S.C. 154(b) by 754 days.

(21) Appl. No.: 11/256,996

(22) Filed: Oct. 24, 2005

(65) Prior Publication Data

US 2006/0092304 A1 May 4, 2006

(30) Foreign Application Priority Data

Oct. 29, 2004 (JP) .......................... P2004-315490

(51) Int. Cl.
H04N 3/14 (2006.01)
H04N 5/335 (2006.01)
H04N 9/64 (2006.01)

(52) U.S. Cl. ....................................... 348/323; 348/249

(58) Field of Classification Search ................. 348/315, 348/322, 323, 248, 249, 282, 283; 257/222
See application file for complete search history.

(56) References Cited

U.S. PATENT DOCUMENTS 5,966,174 A * 10/1999 Yamamoto et al. .......... 348/323
6,661,451 B1 * 12/2003 Kijima et al. ................ 348/322
2001/0038095 A1 * 11/2001 Hamasaki ..................... 257/21
2002/0158980 A1 * 10/2002 Iizuka .......................... 348/280
2004/0150733 A1 * 8/2004 Nagayoshi et al. .......... 348/272
2005/0117043 A1 * 6/2005 Fujii et al. .................. 348/311
2005/0280726 A1 * 12/2005 Parks et al. ................. 348/282

* cited by examiner

Primary Examiner—Jason Whipkey
(74) Attorney, Agent, or Firm—Sonnenschein Nath & Rosenthal LLP

(57) ABSTRACT

A solid-state imaging device includes an imaging unit, a charge control unit, and a horizontal transfer unit. The imaging unit includes a plurality of pixels arranged into a matrix for performing photoelectric conversion, and a plurality of vertical transfer units arranged in columns for vertically transferring signal charges of the plurality of pixels on a column-by-column basis. In a predetermined operation mode, a predetermined number of columns greater than one are used as a unit, and the charge control unit stops transferring charges from a vertical transfer unit in a predetermined column of the predetermined number of columns, and adds the signal charges transferred from the vertical transfer units in the two or more remaining columns of the predetermined number of columns to output the added signal charges. The horizontal transfer unit horizontally transfers the signal charges output from the charge control unit.

8 Claims, 13 Drawing Sheets

SOLID-STATE IMAGING DEVICE WITH ENHANCED PIXEL THINNING OUT CONFIGURATION, METHOD FOR DRIVING SAME, AND IMAGE APPARATUS INCORPORATING SAME

CROSS REFERENCES TO RELATED APPLICATIONS

The present invention contains subject matter related to Japanese Patent Application JP 2004-315490 filed in the Japanese Patent Office on Oct. 29, 2004, the entire contents of which are incorporated herein by reference.

BACKGROUND OF THE INVENTION

1. Field of the Invention

The present invention relates to solid-state imaging devices, methods for driving solid-state imaging devices, and imaging apparatuses. More specifically, the present invention relates to a charge-transfer solid-state imaging device, such as a charge-coupled-device (CCD) imaging device, a method for driving the solid-state imaging device, and an imaging apparatus, such as a digital still camera, including the charge-transfer solid-state imaging device as an imaging device.

2. Description of the Related Art

Imaging apparatuses, e.g., digital still cameras (DSCs), include all-pixel-readout solid-state imaging devices, such as CCD imaging devices, as imaging devices. In the all-pixel-readout solid-state imaging devices, signal charges of all pixels that are simultaneously read out to vertical transfer units are vertically transferred individually, rather than jointly, by the vertical transfer units, and are horizontally transferred and output by a horizontal transfer unit. The number of pixels in CCD imaging devices for DSCs has increased in order to increase the still image quality.

In CCD imaging devices including multiple pixels, smearing due to higher-density cells (or unit pixels) is conspicuous, and, in particular, is conspicuous in a moving-image capturing mode or a monitoring mode. Smearing is a phenomenon unique to CCD imaging devices in which vertical bright stripes appear in high-brightness areas of an image of an object when bright light enters vertical transfer units for transferring signal charges. The longer the signal charges remain in the vertical transfer units, the more conspicuous the smearing effect is.

The frame interline transfer (FIT) method that is used in professional broadcast CCD imaging devices is one solution for reducing the occurrence of smearing. In FIT-type CCD imaging devices, a light-shielded accumulator for temporarily accumulating signal charges transferred by vertical transfer units is provided below an imaging unit including a matrix of pixels. The signal charges are read out from the pixels to the vertical transfer units, and are then rapidly transferred to the accumulator by the vertical transfer units performing a high-speed transfer operation. The period of time during which the signal charges remain in the vertical transfer units is reduced, thereby reducing the occurrence of smearing.

However, such FIT-type CCD imaging devices with accumulators lead to a large chip size, which is about 1.5 to 2 times as large as the chip size of CCD imaging devices of the interline transfer (IT) type without accumulators. In view of cost, therefore, it is difficult to use FIT-type CCD imaging devices as imaging devices in consumer imaging apparatuses, such as digital still cameras.

While the VGA quality (640 pixels wide by 480 pixels high) is suitable for the DSC video function, demands for DSC CCD imaging devices including a large number of pixels have increased in order to increase the still image quality. With the demands for CCD imaging devices including more pixels, an increased number of pixels lead to a large gap between the frame rate in a still-image capturing mode and the frame rate used for the vide function (including monitoring).

One known implementation of the video function is a technique for thinning out signal charges read out from pixels in the vertical direction to increase the frame rate. For example, referring to FIG. 12, in color coding of two (horizontal) by two (vertical) pixel patterns, two pixels of each color for every 16 vertical pixels (16 lines) are read out to vertical transfer units and added in the vertical transfer units, and the signal charges of the remaining pixels are not read out (or are thinned out) (4/16-line readout).

In the vertical thinning-out and addition operation, signal charges of four pixels for every 16 pixels are read out to the vertical transfer units, and signal charges of 12 pixels are not read out, that is, 12 pixels are thinned out. In the vertical transfer units, packets of the read out signal charges (a packet is the unit in which charges are handled) and empty packets of the unread signal charges include smear components, and the smear components are added by charge transfer. Thus, although the signal components are thinned out, the number of smear components increases, and the occurrence of smearing increases.

Due to a high thinning-out rate, or a large number of pixels being thinned out, information regarding the thinned out pixels is not reflected in the final captured image, and false-color signals or moiré artifacts are caused. In addition, the amount of horizontal pixel information is excessively larger than the amount of vertical pixel information, which is uneconomical, and there is no balance between the vertical resolution and the horizontal resolution.

In the related art, the number of vertical pixels to be thinned out is reduced to increase the amount of pixel information, thereby preventing the occurrence of smearing or the generation of false-color signals. Furthermore, in order to prevent the horizontal driving frequency (the driving frequency of the horizontal transfer unit) from increasing due to an increased amount of pixel information, pixel addition is also performed in the horizontal direction to reduce the amount of pixel information (see, for example, Japanese Unexamined Patent Application Publication No. 11-234569).

For example, referring to FIG. 13, in color coding of two (horizontal) by two (vertical) pixel patterns, two pixels of each color for every eight vertical pixels (eight lines) are read out to vertical transfer units and added in the vertical transfer units (4/8-line readout), and two pixels of each color in the horizontal direction are added in a horizontal transfer unit. The number of pixels from which signal charges are not read out is therefore reduced to one third compared with 4/16-line readout, thereby reducing the occurrence of smearing or the generation of false-color signals.

SUMMARY OF THE INVENTION

The above-described technique of the related art can reduce the occurrence of smearing and the generation of false-color signals by increasing the amount of vertical pixel information using a combination of thinning-out and addition in the vertical direction and two-pixel addition in the horizontal direction, and can prevent the horizontal driving frequency from increasing by reducing the amount of horizontal pixel information. However, the amount of horizontal pixel information can only be reduced to ½ while the amount of vertical pixel information is reduced to ¼. That is, the amount of horizontal pixel information is two times as large as the amount of vertical pixel information, and the problem of no balance between the vertical resolution and the horizontal resolution still remains.

It may be possible to reduce the amount of horizontal pixel information by using the thinning-out and addition operation in the vertical and horizontal directions. In the related art, however, since the thinning-out and addition operation is carried out in charge transfer units, as discussed above, the smear components included in the empty packets are added by charge transfer, and the number of smear components increases although the signal components are thinned out, and the occurrence of smearing increases.

A solid-state imaging device according to an embodiment of the present invention includes a plurality of pixels arranged into a matrix for performing photoelectric conversion and a plurality of vertical transfer units arranged in columns for vertically transferring signal charges of the plurality of pixels on a column-by-column basis, and a horizontal transfer unit for horizontally transferring the signal charges transferred from the plurality of vertical transfer units. In a predetermined operation mode, a predetermined number of columns greater than one are used as a unit, transfer of charges from a vertical transfer unit in a predetermined column of the predetermined number of columns is stopped, and the signal charges transferred from the vertical transfer units in the remaining columns of the predetermined number of columns are added or read out to output the added or read out signal charges.

In the solid-state imaging device with the above-described configuration or an imaging apparatus including the solid-state imaging device as an imaging device, when a predetermined operation mode is set, transfer of charges from a vertical transfer unit in a predetermined column of a predetermined number of columns greater than one that are used as a unit is stopped, and the signal charges transferred from the vertical transfer units in the remaining columns are added or read out to output the added or read out signal charges, thereby performing the thinning-out and addition or thinning-out and read-out processing in the horizontal direction. That is, with respect to the column for which transfer of charges is stopped, pixel information is thinned out.

The number of pixels to be thinned out or the number of pixels to be added can arbitrarily be set depending on the number of pixels to be thinned and added in the vertical direction to provide a good balance between the vertical resolution and the horizontal resolution and to reduce the horizontal driving frequency. Furthermore, transfer of charges of the vertical transfer unit in the column of which pixels are to be thinned out is stopped, thereby allowing the signal components and the smear components to be thinned out. No empty packets including only smear components are produced in the horizontal transfer unit, thus preventing the occurrence of smearing.

According to an embodiment of the present invention, in units of a plurality of columns of a plurality of vertical transfer units, transfer of charges from a vertical transfer unit in a predetermined column of the plurality of columns is stopped, and the signal charges transferred from the vertical transfer units in the remaining columns are added or read out to output the added or read out signal charges. The thinning-out and addition or thinning-output and read-out processing without the occurrence of smearing is performed in the horizontal direction to reduce the amount of horizontal pixel information. Therefore, there is a good balance between the vertical resolution and the horizontal resolution, and the horizontal driving frequency can be reduced.

DESCRIPTION OF THE PREFERRED EMBODIMENTS

An embodiment of the present invention will now be described in detail with reference to the drawings.

Figure 1:
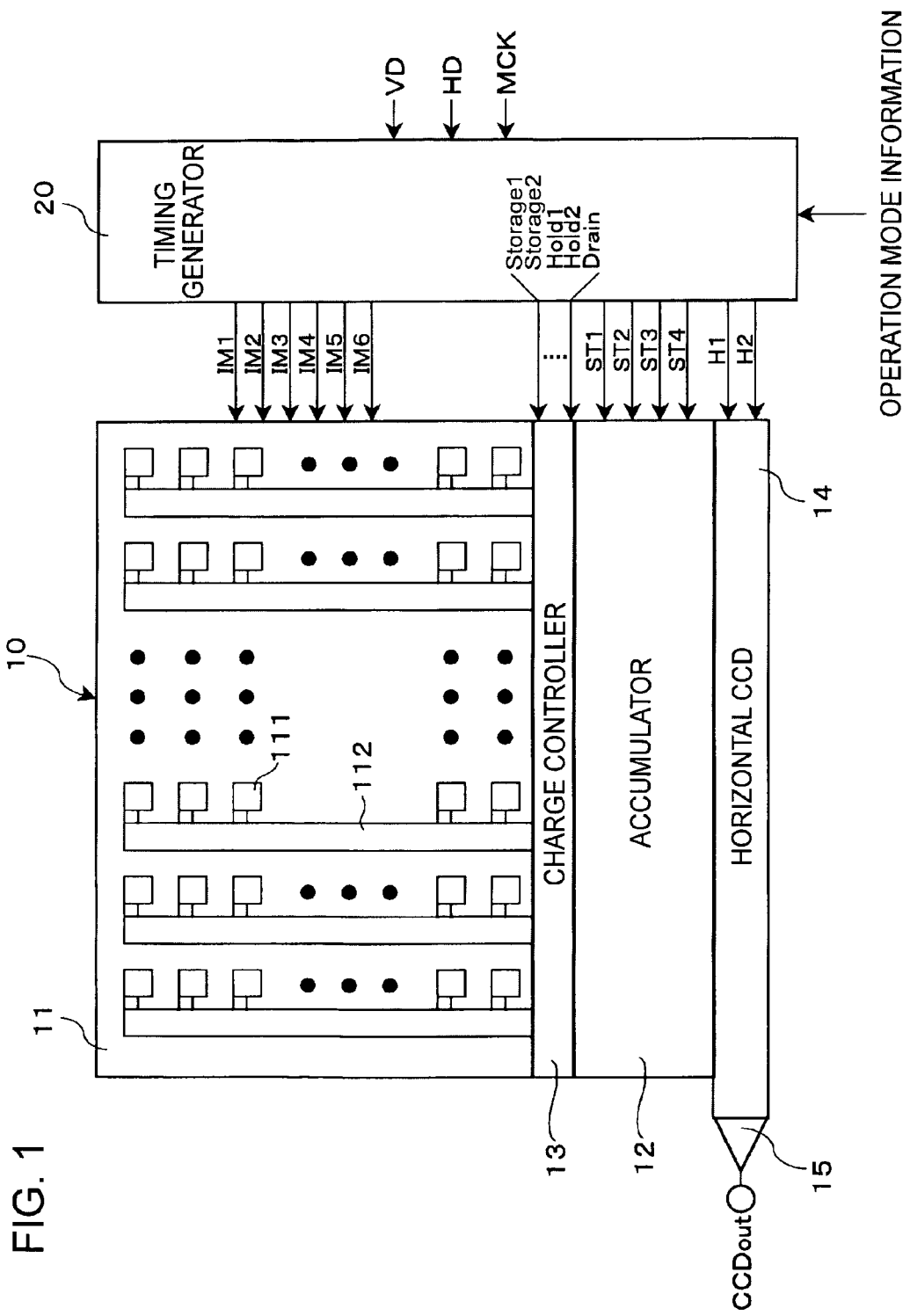
FIG. 1 is a schematic configuration diagram of an FIT-type CCD imaging device according to an embodiment of the present invention.

FIG. 1 is a schematic configuration diagram showing the configuration of a charge-transfer solid-state imaging device according to an embodiment of the present invention, e.g., a CCD imaging device 10. The CCD imaging device 10 shown in FIG. 1 has an FIT-type device configuration including, for example, an imaging unit 11 and an accumulator 12.

Referring to FIG. 1, the imaging unit 11 includes a matrix of pixels (photosensors including photoelectric conversion devices) 111 for converting incident light into signal charges of an amount corresponding to the amount of the incident light, and a plurality of vertical CCDs (vertical transfer units) 112 each provided for a column of pixels in the matrix of pixels 111. The signal charges photoelectrically converted by the pixels 111 and read out from the pixels 111 are vertically transferred on a column-by-column basis by the vertical CCDs.

According to an embodiment of the present invention, a charge controller 13 is provided between the imaging unit 11 and the accumulator 12. The specific configuration and operation of the charge controller 13 are discussed in detail below in the context of two embodiments.

The accumulator 12 is a region shielded from light, and is used for temporarily accumulating the signal charges supplied via the charge controller 13. The vertical CCDs 112 and the charge controller 13 are driven to perform a high-speed transfer operation, and the signal charges are rapidly transferred to the accumulator 12 from the vertical CCDs 112 and the charge controller 13.

As is known in the art, the FIT-type CCD imaging device 10 including the accumulator 12 can reduce the period of time during which the signal charges remain in the vertical CCDs 112, and is therefore greatly effective to reduce the occurrence of smearing.

The signal charges temporarily accumulated in the accumulator 12 are sequentially shifted (or transferred) to a horizontal CCD (horizontal transfer unit) 14. The horizontal CCD 14 horizontally transfers the signal charges shifted from the accumulator 12. The CCD imaging device 10 further includes a charge detecting unit 15 at the leading end of the horizontal CCD 14. The charge detecting unit 15 includes, for example, floating-diffusion amplifiers, and is adapted to convert the signal charges sequentially transferred by the horizontal CCD 14 into voltage signals and to output the signals from a port CCDout.

The CCD imaging device 10 with the above-described configuration is driven by various timing signals generated by a timing generator (TG) 20. Based on a vertical synchronization signal VD, a horizontal synchronization signal HD, and a master clock MCK, the timing generator 20 generates timing signals including, for example, six-phase vertical transfer pulses IM1 to IM6 for driving the vertical CCDs 112, storage pulses Storage1 and Storage2 and hold pulses Hold1 and Hold2 for driving the charge controller 13, for example, four-phase vertical transfer pulses ST1 to ST4 for driving the accumulator 12, for example, two-phase horizontal transfer pulses H1 and H2 for driving the horizontal CCD 14. These timing signals are generated so as to have the timing relationship corresponding to capturing mode information supplied from the outside. For example, a drain voltage Drain is supplied to the charge controller 13 from the timing generator 20.

Configuration of Charge Controller

The specific configuration and operation of the charge controller 13 will now be described in detail in the context of two embodiments.

First Embodiment

Figure 2:
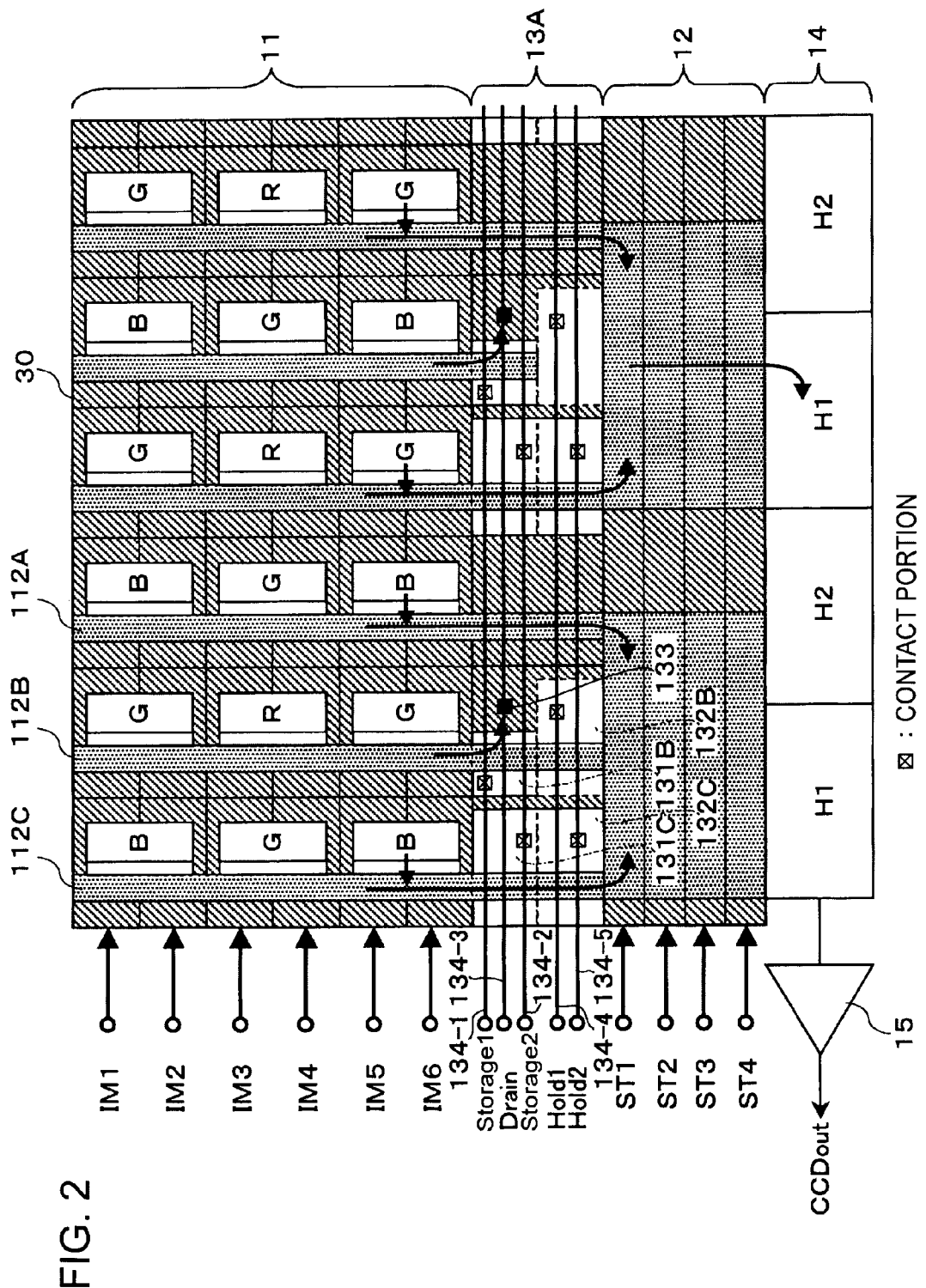
FIG. 2 is a schematic plan pattern view showing the configuration of the main part including a charge controller according to a first embodiment of the present invention.

FIG. 2 is a schematic plan pattern view showing the configuration of the main part including a charge controller 13A according to a first embodiment of the present invention. Color coding of a color filter (not shown) provided on the top layer of the imaging unit 11 is based on two (horizontal) by two (vertical) pixel patterns, by way of example, and the charge controller 13A performs processing in units of three columns (i.e., three horizontal pixels).

In a predetermined operation mode, in units of a plurality of columns of the plurality of vertical CCDs 112, and the charge controller 13A according to the first embodiment stops transferring charges from a vertical CCD 112 in a predetermined column of the plurality of columns to thin out the charges, and adds signal charges transferred from the two or more remaining vertical CCDs 112 to output the added signal charges. This processing is hereinafter referred to as horizontal thinning-out and addition processing. In another operation mode different from the predetermined operation mode, the charge controller 13A converts signal charges transferred in parallel from the vertical CCDs 112 in units of the plurality of columns into serially arranged signal charges, and sequentially outputs the serially arranged signal charges.

Referring to FIG. 2, three vertical CCDs 112, namely, vertical CCDs 112A, 112B, and 112C, are used as a unit. With respect to, for example, adjacent two vertical CCDs 112B and 112C in the three vertical CCDs 112A, 112B, and 112C, the charge controller 13A is independently provided with storage electrodes 131B and 131C and hold electrodes 132B and 132C in each of the channels in such a manner that the storage electrodes 131B and 131C are closer to the imaging unit 11.

With respect to the remaining vertical CCD 112A, the charge controller 13A is not provided with a storage electrode or a hold electrode. With respect to the middle vertical CCD 112B in the three vertical CCDs 112A, 112B, and 112C, the storage electrode 131B is horizontally narrower (in width) than the storage electrode 131C, and a drain portion 133 serving as a charge drain unit is further provided in the lateral region of the storage electrode 131B.

As discussed above, the charge controller 13A with the above-described configuration is driven and controlled by the control pulses generated by the timing generator 20, i.e., the storage pulses Storage1 and Storage2, the drain voltage Drain, and the hold pulses Hold1 and Hold2, to perform the horizontal thinning-out and addition processing.

Specifically, the storage pulse Storage1 is carried by a control line 134-1 to drive the storage electrode 131B, and the storage pulse Storage2 is carried by a control line 134-2 to drive the storage electrode 131C. The drain voltage Drain is carried by a control line 134-3 to drive the drain portion 133. The hold pulse Hold1 is carried by a control line 134-4 to drive the hold electrode 132B, and the hold pulse Hold2 is carried by a control line 134-5 to drive the hold electrode 132C.

For example, the control lines 134-1 to 134-5 carrying the storage pulses Storage1 and Storage2, the drain voltage Drain, and the hold pulses Hold1 and Hold2 extend in parallel to one another across the charge controller 13A in the arrangement direction of the vertical CCDs 112 (i.e., the horizontal direction), and have a shunt configuration such that the storage electrodes 131B and 131C, the drain portion 133, the hold electrodes 132B and 132C are brought into electrical contact for every three columns.

That is, the storage electrode 131B and the hold electrode 132B provided for the vertical CCD 112B are driven by a combination of the storage pulse Storage1 and the hold pulse Hold1, and the storage electrode 131C and the hold electrode 132C provided for the vertical CCD 112C are driven by a combination of the storage pulse Storage2 and the hold pulse Hold2.

The imaging unit 11, the charge controller 13A, and the accumulator 12 include channel stop regions 30, as hatched in FIG. 2.

The charge controller 13A with the above-described configuration performs the horizontal thinning-out and addition processing in units of three columns (i.e., three horizontal pixels), by way of example, so as to support, for example, vertical three-pixel addition.

A method for driving the CCD imaging device 10 including the charge controller 13A with the above-described configuration will now be described in the context of a moving-image capturing mode for capturing a moving image (including a monitoring mode) and a still-image capturing mode for capturing a still image.

Moving-Image Capturing Mode

First, the vertical pixel addition operation in the moving-image capturing mode will be described with reference to FIG. 3.

As an example, in a case of color coding based on a primary-color Bayer array having two (horizontal) by two (vertical) pixel patterns, three-pixel addition in which three pixels of the same color are added for every other pixel is used, and the processing for thinning out pixels is not performed.

Figure 3:
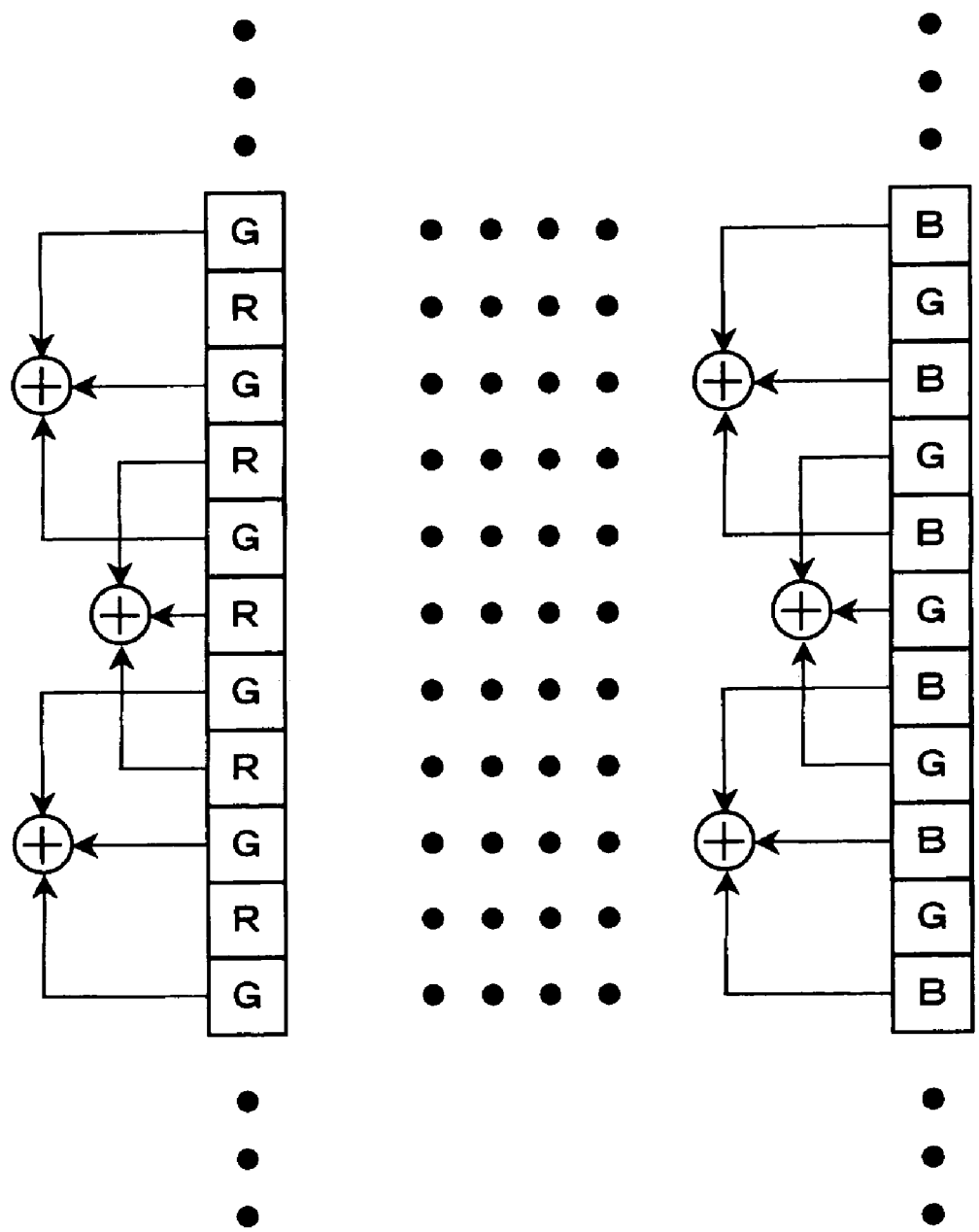
FIG. 3 is a conceptual diagram showing vertical pixel addition in the first embodiment.

Addition of three pixels of the same color for every other pixel is performed in the vertical direction without performing the thinning-out processing, thereby allowing for uniformity of the centroid of pixels in taking a moving image, as can be seen from equal intervals in the vertical direction between adders, indicated by typical signs in FIG. 3 for adding pixels. No thinning-out of pixel information prevents the generation of false-color signals. In addition, since the processing for thinning out pixel information is not performed, no empty packets are produced during vertical transfer, thus preventing the occurrence of smearing.

Now, the operation of the charge controller 13A in the moving-image capturing mode, that is, the horizontal thinning-out and addition operation, will be described with reference to a timing chart shown in FIG. 4.

In the timing chart shown in FIG. 4, when the fifth-phase vertical transfer pulse IM5 and then the sixth-phase vertical transfer pulse IM6 are sequentially brought to a high level (hereinafter referred to as an "H" level) from a low level (hereinafter referred to as an "L" level), the vertical CCDs 112 (112A, 112B, and 112C) transfer the signal charges of the pixels in the bottom row of the imaging unit 11 to the charge controller 13A. In units of three columns, i.e., the vertical CCDs 112A, 112B, and 112C, the signal charges of the vertical CCD 112A in the first column are transferred to the accumulator 12, passing through the charge controller 13A.

The storage pulse Storage1 is in the "H" level state so that the potential under the storage electrode 131B becomes deep, and the hold pulse Hold1 is in the "L" level state so that the potential under the hold electrode 132B becomes shallow. Thus, the signal charges of the vertical CCD 112B in the second column are accumulated under the storage electrode 131B, and a potential barrier produced under the hold electrode 132B stops transferring these signal charges to the accumulator 12. The potential barrier stops transferring not only the signal components (i.e., the signal charges) but also smear components (or smear charges). The accumulated charges over the potential barrier are drained to the drain portion 133 by the following vertical transfer operation.

The storage pulse Storage2 and the hold pulse Hold2 undergo a transition from the "L" level to the "H" level in synchronization with the rising of the fifth-phase vertical transfer pulse IM5 so that the potential under the storage electrode 131C and the potential under the hold electrode 132C become deep. Thus, as in the signal charges of the vertical CCD 112A in the first column, the signal charges of the vertical CCD 112C in the third column are transferred to the accumulator 12, passing through the charge controller 13A.

Accordingly, in a case where the horizontal thinning-out and addition processing is performed in units of three columns, i.e., the vertical CCDs 112A, 112B, and 112C, the charge controller 13A stops transferring the signal charges of the middle vertical CCD 112B, and transmits the signal charges of the side vertical CCDs 112A and 112C so that the transmitted signal charges are added in the accumulator 12. In the moving-image capturing mode, therefore, the charge controller 13A allows the horizontal thinning-out and addition processing for thinning out the pixel information (including the smear components) of the middle column and adding the pixel information for the side columns.

In the first embodiment, when color coding of two (horizontal) by two (vertical) pixel patterns is carried out in units of three columns, as shown in FIG. 2, in a certain line, a signal charge of a green (G) pixel in a certain unit is thinned out and signal charges of blue (B) pixels on both sides of the G pixel are added, and a signal charge of a B pixel is thinned out in the adjacent unit and signal charges of B pixels on both sides of the B pixel are added. In the next line, a signal charge of a B pixel is thinned out in a certain unit and signal charges of B pixels on both sides of the B pixel are added, and a signal charge of a G pixel is thinned out in the adjacent unit and signal charges of B pixels on both sides of the G pixels are added.

The signal charges that are obtained by the charge controller 13A performing thinning-out to, for example, two third of the number of horizontal pixels, followed by addition, are vertically transferred to the horizontal CCD 14 by the four-phase (ST1 to ST4) driving in the accumulator 12. In the horizontal CCD 14, the signal charges are horizontally transferred by the two-phase (H1 and H2) driving to the charge detecting unit 15. The charge detecting unit 15 converts the signal charges into voltage signals and outputs the converted signals.

In the capturing operation in the moving-image capturing mode, therefore, the horizontal thinning-out and addition processing is performed, and the number of pixels to be added and the number of pixels to be thinned out can arbitrarily be set depending on the number of pixels to be added in the vertical direction to prevent the amount of horizontal image information from being excessively larger than the amount of vertical pixel information and to allow the same rate of pixel information in both directions. Therefore, there is a good balance between the horizontal resolution and the vertical resolution of a moving image. In the case of the first embodiment, in association with vertical three-pixel addition, one pixel is thinned out for every three horizontal pixels. The amount of pixel information in the vertical and horizontal directions is therefore reduced to ⅓.

Figure 5:
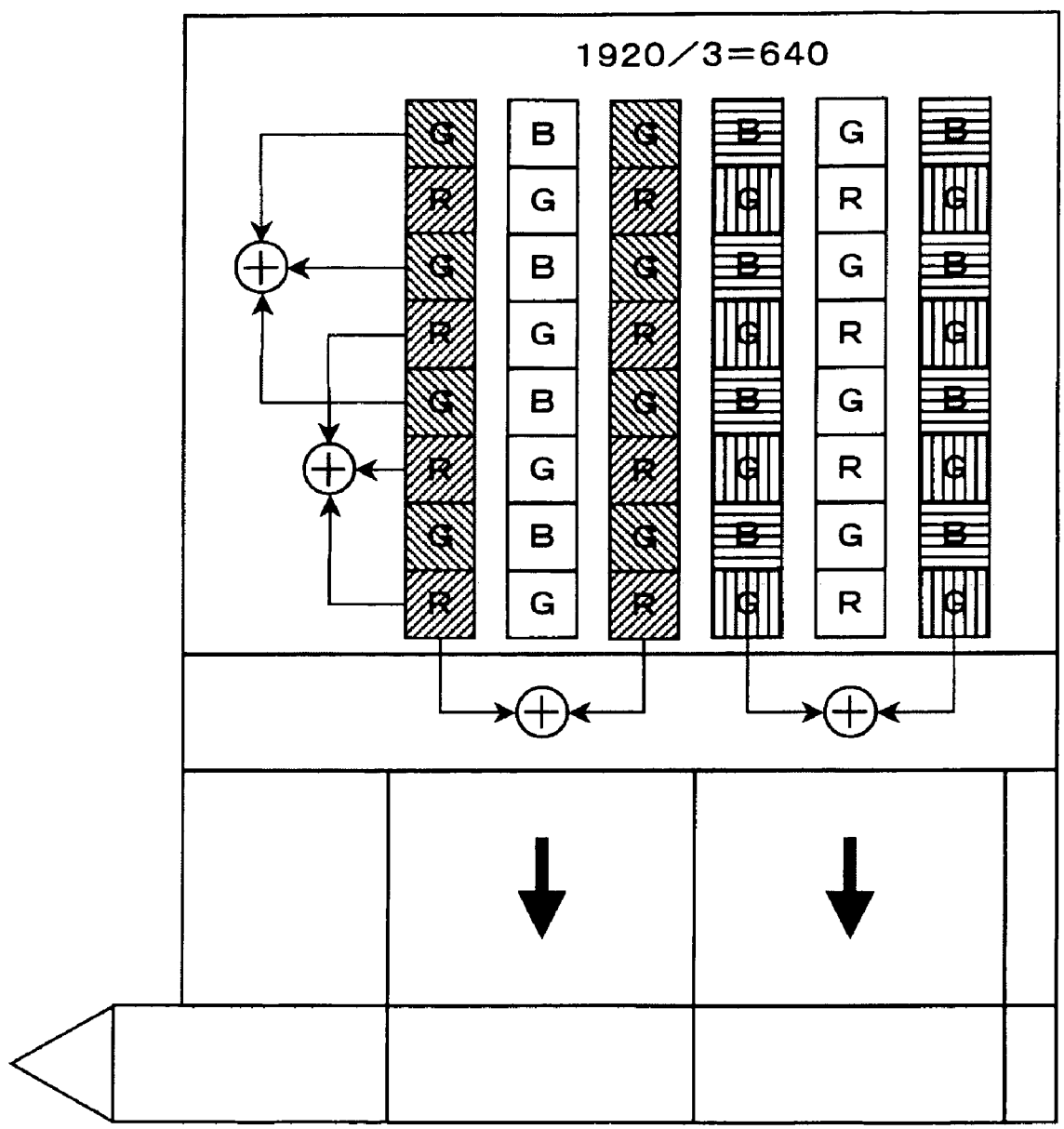
FIG. 5 is a conceptual diagram showing vertical addition and horizontal thinning-out and addition in units of three pixels in both vertical and horizontal directions, by way of example.

FIG. 5 is a conceptual diagram showing vertical addition and horizontal thinning-out and addition in units of, for example, three pixels in the vertical and horizontal directions. In a case of a CCD imaging device including 1920 (vertical) by 2560 (horizontal) pixels, by way of example, pixel information of 640 (vertical) by 853 (horizontal) pixels is obtained by performing vertical and horizontal pixel addition (with the horizontal thinning-out processing) in units of three pixels. Thus, there is a good balance between the horizontal resolution and the vertical resolution of a moving image. The centroid of pixels in both vertical and horizontal directions can also be uniform.

In particular, the charge controller 13A provided between the imaging unit 11 and the accumulator 12 allows the signal charges of vertical CCDs 112 in the columns of which pixels are to be added, e.g., the vertical CCDs 112A and 112C, to be transmitted and added in the accumulator 12 before they are transferred to the horizontal CCD 14. No empty packets are produced in the horizontal CCD 14 due to no thinning-out, thus preventing the occurrence of smearing caused by addition of smear components in empty packets. That is, transfer of charges from the vertical CCD 112B of which pixels are to be thinned out is stopped to thin out the signal components and the smear components, thus preventing the occurrence of smearing.

In the first embodiment, in color coding based on two (horizontal) by two (vertical) pixel patterns, horizontal thinning-out and addition processing is performed in units of three columns (i.e., three horizontal pixels) to thin out the pixel information for the middle column and to add the pixel information for the side columns. Therefore, advantageously, pixel information of pixels of the same color can be added.

In the first embodiment, in color coding based on a primary-color Bayer array having two (horizontal) by two (vertical) pixel patterns, in units of three columns of the vertical CCDs 112, the pixel information for the middle column is thinned out while the pixel information for the side columns are added. However, this is merely an example, and any other form may be used.

The color coding scheme of the color filter is not limited to color coding based on a primary-color Bayer array, and may be color coding based on a primary-color stripe array, a complementary-color lattice array, or the like. The number of columns used as a unit of thinning-out and addition is not limited to three but may be four or more. The column of which the pixel information is to be thinned out is not limited to one middle column. The column of which the pixel information is to be thinned out or the column of which the pixel information is to be added can be determined depending on the color coding scheme.

The pixels of which pixel information is to be added are not limited to pixels of the same color. For example, pixels of different primary colors may be added to obtain complementary-color pixel information. In this case, a signal processing system in the subsequent stage of the CCD imaging device 10 regenerates the original primary colors from the complementary color.

Still-Image Capturing Mode

Next, the operation of the charge controller 13A in the still-image capturing mode will be described with reference to a timing chart shown in FIG. 6.

In the first embodiment, the horizontal thinning-out and addition processing is performed in units of, for example, three columns (i.e., three horizontal pixels). The charge controller 13A performs processing for converting the signal charges transferred in parallel from the three vertical CCDs 112A, 112B, and 112C into serially arranged signal charges and sequentially outputting the serially arranged signal charges. In the still-image capturing mode in which the signal charges of all pixels are independently read out, three-line sequence is used in which signal charges of pixels in one row are read out in three blocks.

In the three-line sequence, signal charges of pixels corresponding to ⅓ of the number of pixels in one row of the imaging unit 11 are sequentially transferred in each-line sequence by the charge controller 13A, the accumulator 14, and the horizontal CCD 12, and are output via the charge detecting unit 15. The total processing time of the three-line sequence is substantially the same as the processing time of a sequence in which signal charges of pixels in one row of the imaging unit 11 are sequentially transferred by the accumulator 14 and the horizontal CCD 12 and are output via the charge detecting unit 15.

Figure 6:
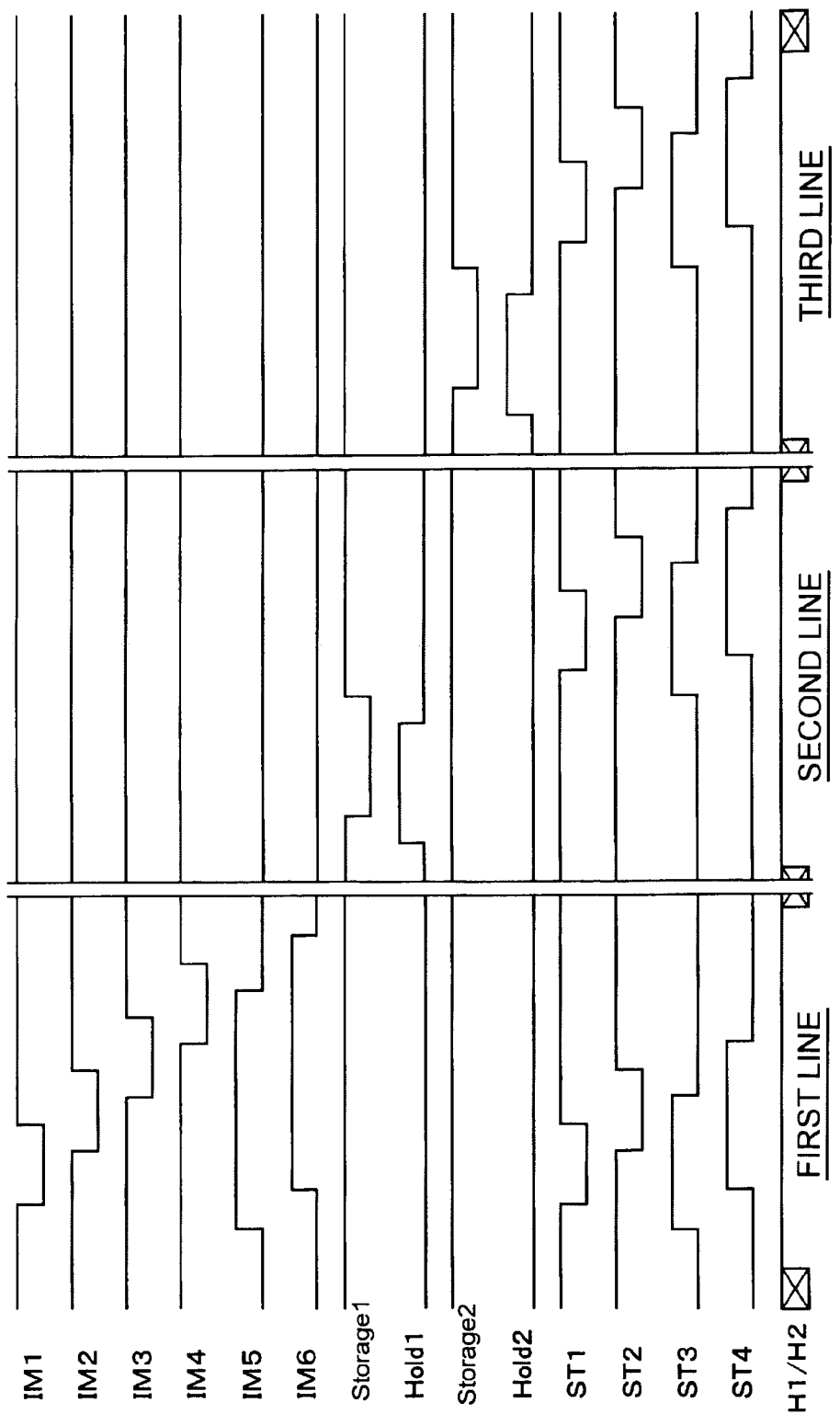
FIG. 6 is a timing chart showing the operation of the charge controller according to the first embodiment in a still-image capturing mode.

In the timing chart shown in FIG. 6, when the fifth-phase vertical transfer pulse IM5 and then the sixth-phase vertical transfer pulse IM6 are sequentially brought to an "H" level from an "L" level, the vertical CCDs 112 (112A, 112B, and 112C) transfer the signal charges of the pixels in the bottom row of the imaging unit 11 in parallel to the charge controller 13A.

In units of three columns, i.e., the vertical CCDs 112A, 112B, and 112C, first, the signal charges of the vertical CCD 112A in the first column are transferred to the accumulator 12, passing through the charge controller 13A. The storage pulses Storage1 and Storage2 are in the "H" level state so that the potentials under the storage electrodes 131B and 131C become deep, and the hold pulses Hold1 and Hold2 are in the "L" level state so that the potentials under the hold electrodes 132B and 132C become shallow. Thus, the signal charges of the vertical CCDs 112B and 112C in the second and third columns are accumulated under the storage electrodes 131B and 131C, and potential barriers produced under the hold electrodes 132B and 132C stop transferring charges to the accumulator 12.

The signal charges of the vertical CCD 112A in the first column transferred to the accumulator 12 through the charge controller 13A are vertically transferred to the horizontal CCD 14 by the four-phase (ST1 to ST4) driving in the accumulator 12. In the horizontal CCD 14, the signal charges are horizontally transferred by the two-phase (H1 and H2) driving to the charge detecting unit 15. The charge detecting unit 15 converts the signal charges into voltage signals and outputs the converted signals. The processing of the first-line sequence is now completed, and then the processing of the second-line sequence is performed.

In the second-line sequence, the hold pulse Hold1 is brought to the "H" level from the "L" level so that the potential under the hold electrode 132B becomes deep, and the storage pulse Storage1 is then brought to the "L" level from the "H" level so that the potential under the storage electrode 131B becomes shallow. Thus, the signal charges of the vertical CCD 112B in the second column held under the storage electrode 131B are transferred to the accumulator 12, passing through the charge controller 13A.

The signal charges of the vertical CCD 112C in the third column are still held under the storage electrode 131C. The signal charges of the vertical CCD 112B in the second column transferred to the accumulator 12 through the charge controller 13A are vertically transferred by the accumulator 12 to the horizontal CCD 14. In the horizontal CCD 14, the signal charges are horizontally transferred to the charge detecting unit 15. The charge detecting unit 15 converts the signal charges into voltage signals and outputs the converted signals. The processing of the second-line sequence is now completed, and then the processing of the third-line sequence is performed.

In the third-line sequence, the hold pulse Hold2 brought to the H" level from the "L" level so that the potential under the hold electrode 132C becomes deep, and the storage pulse Storage2 is then brought to the "L" level from the "H" level so that the potential under the storage electrode 131C becomes shallow. Thus, the signal charges of the vertical CCD 112C in the third column held under the storage electrode 131C are transferred to the accumulator 12, passing through the charge controller 13A.

The signal charges of the vertical CCD 112C in the third column transferred to the accumulator 12 through the charge controller 13A are vertically transferred by the accumulator 12 to the horizontal CCD 14. In the horizontal CCD 14, the signal charges are horizontally transferred to the by the charge detecting unit 15. The charge detecting unit 15 converts the signal charges into voltage signals, and outputs the converted signals. The processing of the third-line sequence, that is, the processing of the overall three-line sequence, is now completed.

As a result, as discussed above, the charge controller 13A allows the signal charges of three pixels transferred in parallel in units of three vertical CCDs 112 of the imaging unit 11, i.e., the vertical CCDs 112A, 112B, and 112C, to be converted into serially arranged signal charges, which are then sequentially transferred to the accumulator 12. The pixel signals output after the three-line sequence are returned to the original pixel array of one row of the imaging unit 11 by the signal processing system in the subsequent stage of the CCD imaging device 10 by alternately rearranging the three-line pixel signals using a line memory or the like.

In the still-image capturing mode, therefore, signal charges transferred in parallel from the imaging unit 11 in units of, for example, three columns (i.e., three horizontal pixels), which are used as a unit of the horizontal thinning-out and addition processing, are converted into serially arranged signal charges by the charge controller 13A. Even if the charge controller 13A used for horizontal thinning-out and addition in the moving-image capturing mode is provided between the imaging unit 11 and the accumulator 12, the signal charges of all pixels ill of the imaging unit 11 can independently be read out by the three-line sequence.

In case of performing the horizontal thinning-out and addition processing in units of three columns, the charge controller 13A according to the first embodiment is not provided with a storage electrode or hold electrode for the vertical CCD 112A in the first column, and transfers the signal charges of the vertical CCD 112A in the first column directly to the accumulator 12. Alternatively, the charge controller 13A may be provided with a storage electrode and a hold electrode for the vertical CCD 112A in the first column in a similar manner to that of the vertical CCDs 112B and 112C in the second and third columns, and may temporarily hold the signal charges of the vertical CCD 112A in the first column.

In this case, in either the moving-image capturing mode or the still-image capturing mode, the timing relation may be set so that the temporarily held signal charges of the vertical CCD 112A in the first column can first pass through the charge controller 13A. However, the storage electrode and the hold electrode provided for the vertical CCD 112A in the first column increase the complexity of the configuration and the timing control. It can be understood that no storage electrode or hold electrode provided for the vertical CCD 112A in the first column is more advantageous.

As discussed above, in the FIT-type CCD imaging device 10 including the imaging unit 11 and the accumulator 12, the charge controller 13A according to the first embodiment is provided between the imaging unit 11 and the accumulator 12. In a case where the charge controller 13A performs the horizontal thinning-out and addition processing in the moving-image capturing mode, the number of pixels to be added and to be thinned out in the horizontal direction can arbitrarily be set depending on the number of pixels to be added in the vertical direction (possibly with the thinning-out processing), thereby preventing the amount of horizontal image information from being excessively larger than the amount of vertical pixel information. Thus, there is a good balance between the horizontal resolution and the vertical resolution of a moving image. Along with the reduction in the amount of horizontal image information, the horizontal driving frequency can be reduced.

In the first embodiment, pixel addition without the thinning-out processing is performed in the vertical direction, and no empty packets are produced in the vertical CCDs 112. The charge controller 13A used for the horizontal thinning-out and addition processing further thins out the signal components and the smear components for the vertical CCD of which pixels are to be thinned out so as not to produce empty packets in the horizontal CCD 14. In the moving-image capturing mode, therefore, the occurrence of smearing caused by pixel addition can be prevented.

In particular, in the first embodiment, with the use of a combination of the FIT type that is greatly effective as a smear reduction solution and the horizontal thinning-out and addition method performed by the charge controller 13A according to the first embodiment, in other words, the light-shielded accumulator 12 mounted in the CCD imaging device including the charge controller 13A according to the first embodiment, the occurrence of smearing can greatly be reduced in the video mode in cooperation with the smear reduction effect of the accumulator 12.

In a case of the FIT-type CCD imaging device 10, in the moving-image capturing mode, the charge controller 13A performs the horizontal thinning-out and addition processing and outputs signal charges to the accumulator 12. In the still-image capturing mode, the charge controller 13A converts the signal charges transferred in parallel from the imaging unit 11 in units of pixels to be subjected to the horizontal thinning-out and addition processing into serially arranged signal charges, and outputs the signal charges to the accumulator 12. Therefore, the amount of pixel information in the horizontal direction can be reduced (to ⅓ when the horizontal thinning-out and addition processing is carried out in units of three horizontal pixels), and the vertical size of the accumulator 12 can also be reduced.

This is because the reduction in the amount of horizontal pixel information allows the horizontal size of a packet in the accumulator 12 to be designed to be larger than the horizontal size of a pixel unit (including a pixel 111 and a vertical CCD 112 associated therewith). For example, in the case of units of three horizontal pixels, the horizontal size of the packet can be designed to be as large as the horizontal size of the three pixel units corresponding to three horizontal pixels. With such a large horizontal size, a certain amount of charge handled by the packet can be maintained if the vertical size of the packet is reduced, and the vertical size of the accumulator 12 can therefore be reduced. Therefore, the chip size of the CCD imaging device 10 can greatly be reduced in the vertical direction.

In a case of an FIT-type CCD imaging device of the related art, the vertical size of the accumulator 12 is generally about 50% larger than the vertical size of the imaging unit 11, and the chip size in the vertical direction of the CCD imaging device is about 1.5 times the vertical size of the imaging unit 11. The chip size of the CCD imaging device directly affects the device price. The FIT-type CCD imaging device is therefore too expensive to mount in a consumer imaging apparatus, e.g., a digital still camera, at the current stage.

In the FIT-type CCD imaging device 10 including the charge controller 13A according to the first embodiment, on the contrary, although it depends on the number of pixels to be added and thinned out in the horizontal thinning-out and addition processing, the horizontal size of a packet of the accumulator 12 can be designed to be as large as the size of three horizontal pixels, and the vertical size of the accumulator 12 can be reduced to about 20% of the vertical size of the imaging unit 11, for example, in a case where the horizontal thinning-out and addition processing is performed in units of three columns (i.e., three horizontal pixels) and one column of pixel (i.e., one pixel) is thinned out. The chip size of the CCD imaging device 10 can therefore be reduced in the vertical direction to about 1.2 times the vertical size of the imaging unit 11.

Accordingly, with the use of horizontal thinning-out and addition using the charge controller 13A, the FIT-type CCD imaging device 10 including the charge controller 13A according to the first embodiment allows significant reduction in chip size and also allows significant reduction in cost. The FIT-type CCD imaging device 10 is therefore suitable to mount in a consumer imaging apparatus, e.g., a digital still camera, which is difficult in the related art in view of cost. Moreover, with the ability to significantly reduce the occurrence of smearing in the video mode in cooperation with the smear reduction effect of the FIT type, the image quality can greatly be increased.

While the first embodiment has been described as an implementation of an FIT-type CCD imaging device including the imaging unit 11 and the accumulator 12, by way of example, the present invention is not limited to this example. CCD imaging devices, such as IT-type CCD imaging devices without the accumulator 12, or charge-transfer solid-state imaging devices other than CCD imaging devices may be employed.

That is, the charge controller 13A is provided below the imaging unit 11, and, in the moving-image capturing mode, the charge controller 13A performs the horizontal thinning-out and addition processing and outputs signal charges to the horizontal CCD 14. In the still-image capturing mode, the charge controller 13A converts the signal charges transferred in parallel from the imaging unit 11 in units of pixels to be subjected to the horizontal thinning-out and addition processing into serially arranged signal charges, and outputs the signal charges to the horizontal CCD 14. Therefore, there is a good balance between the horizontal resolution and the vertical resolution without the occurrence of smearing in the video mode, and the horizontal driving frequency can be reduced.

Second Embodiment

Figure 7:
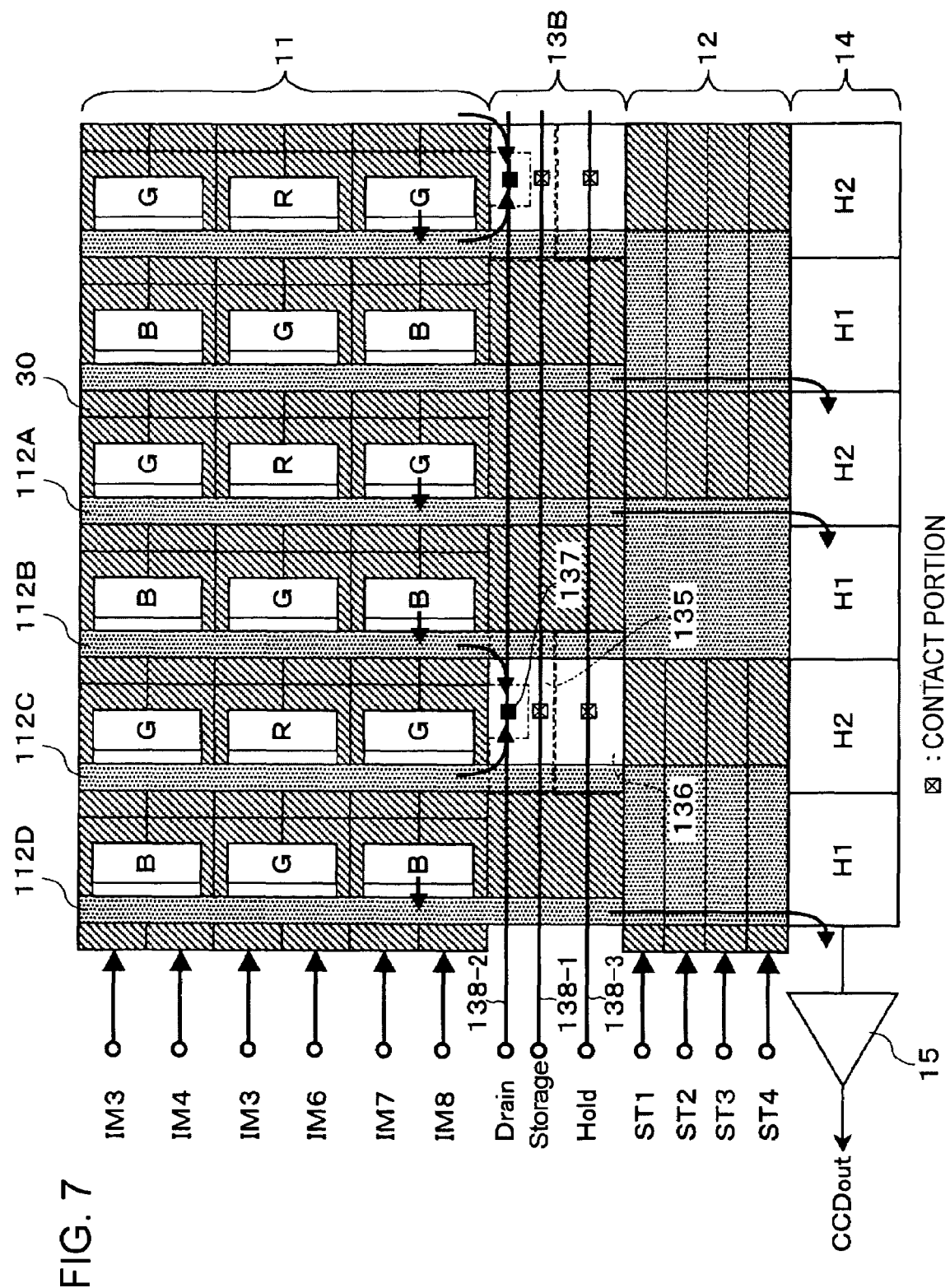
FIG. 7 is a plan view pattern view showing the configuration of the main part including a charge controller according to a second embodiment of the present invention.

FIG. 7 is a schematic plan pattern view showing the configuration of the main part including a charge controller 13B according to a second embodiment of the present invention. In FIG. 7, the portions equivalent to those shown in FIG. 2 are identified by the same reference numerals. Color coding of a color filter (not shown) provided on the top layer of the imaging unit 11 is based on two (horizontal) by two (vertical) pixel patterns, by way of example, and the charge controller 13B performs processing in units of four columns (i.e., four horizontal pixels).

In a predetermined operation mode, a plurality of columns of the vertical CCDs 112 are used as a unit, and the charge controller 13B according to the second embodiment stops transferring charges from a vertical CCD 112 in a predetermined column of the plurality of columns to thin out the charges, and reads out the signal charges transferred from the remaining vertical CCDs 112 to the accumulator 12. This processing is hereinafter referred to as horizontal thinning-out and read-out processing. In another operation mode different from the predetermined operation mode, the charge controller 13A reads out the signal charges transferred in parallel in units of the plurality of columns from the plurality of vertical CCDs 112 using a multiple-line sequence, e.g., a two-line sequence.

Referring to FIG. 7, four vertical CCDs 112, namely, 112A, 112B, 112C, and 112D, are used as a unit. With respect to the middle two vertical CCDs 112B and 112C in the four vertical CCDs 112A, 112B, 112C, and 112D, the charge controller 13B is provided with a storage electrode 135 and a hold electrode 136 in each of the channels so as to extend across the channels in such a manner that the storage electrode 135 is closer to the imaging unit 11.

With respect to the side vertical CCDs 112A and 112D, the charge controller 13B is not provided with a storage electrode or a hold electrode. The storage electrode 135 is partially cut out, and a drain portion 137 serving as a charge drain unit is provided in the cutout region of the storage electrode 135.

As discussed above, the charge controller 13B with the above-described configuration is driven and controlled by the control pulses generated by the timing generator 20, i.e., the storage pulse Storage, the drain voltage Drain, and the hold pulse Hold, to perform the horizontal thinning-out and read-out processing.

Specifically, the storage pulse Storage is carried by a control line 138-1 to drive the storage electrode 135, and the drain voltage Drain is carried by a control line 138-2 to drive the drain portion 137. The hold pulse Hold is carried by a control line 138-3 to drive the hold electrode 136.

For example, the control lines 138-1 to 138-3 carrying the storage pulse Storage, the drain voltage Drain, and the hold pulse Hold extend in parallel to one another across the charge controller 13B in the arrangement direction of the vertical CCDs 112 (i.e., the horizontal direction), and have a shunt configuration such that the storage electrode 135, the drain portion 137, and the hold electrode 136 are brought into electrical contact for every four columns.

The charge controller 13B with the above-described configuration performs the horizontal thinning-out and read-out processing in units of four columns (i.e., four horizontal pixels), by way of example, so as to support, for example, vertical two-pixel addition for every four pixels. In order to perform two-pixel addition for every four pixels in the vertical direction, the vertical CCDs 112 are driven by, for example, eight-phase vertical transfer pulses IM1 to IM8.

A method for driving the CCD imaging device 10 including the charge controller 13B with the above-described configuration will now be described in the context of a moving-image capturing mode for capturing a moving image (including a monitoring mode) and a still-image capturing mode for capturing a still image.

Moving-Image Capturing Mode

First, the vertical pixel addition operation in the moving-image capturing mode will be described with reference to FIG. 8.

As an example, in a case of color coding based on a primary-color Bayer array having two (horizontal) by two (vertical) pixel patterns, two-pixel addition in which two pixels of the same color are added for every other pixel in units of four pixels is used, and the processing for thinning out a pixel is not performed.

Figure 8:
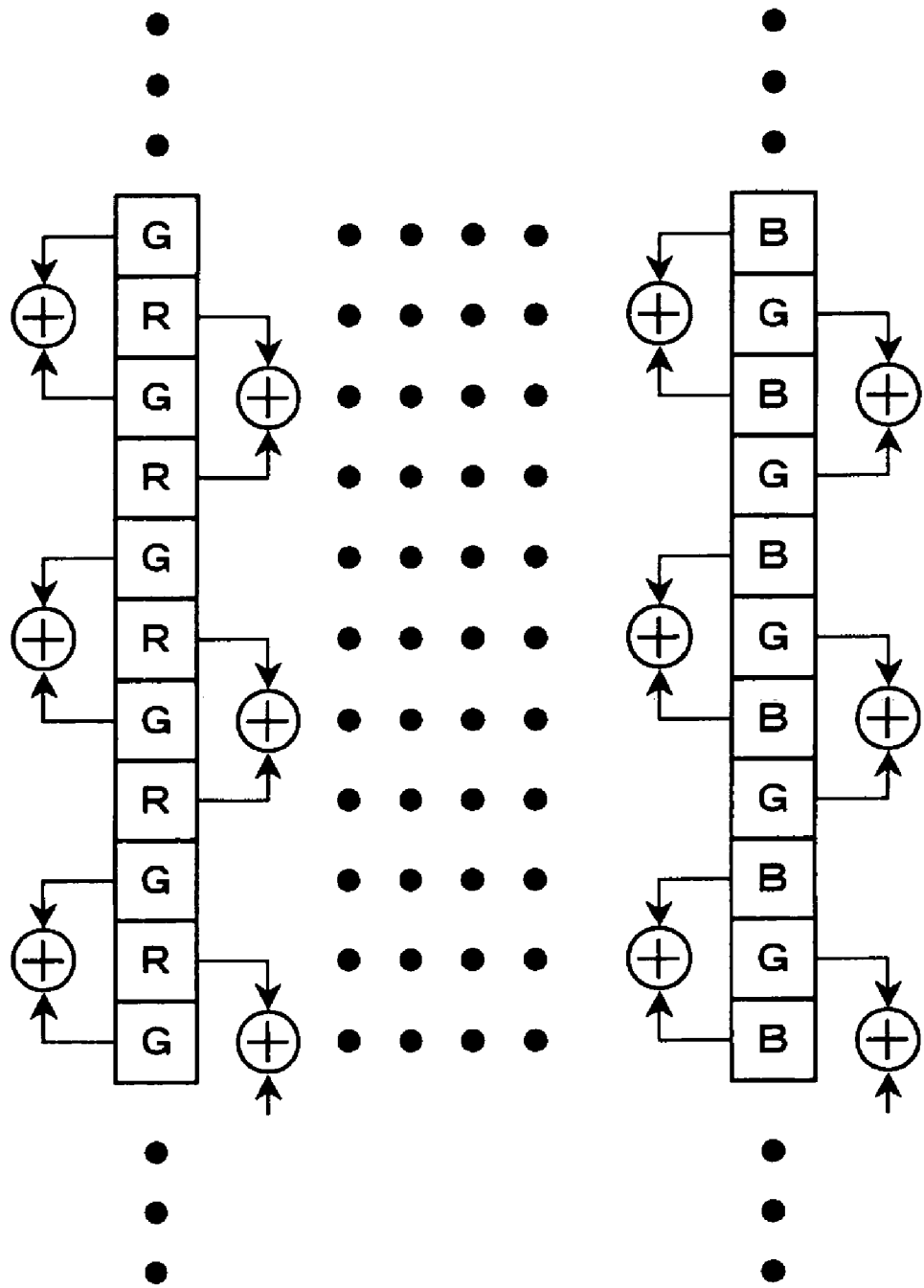
FIG. 8 is a conceptual diagram showing vertical pixel addition in the second embodiment.

Addition of two pixels of the same color for every other pixel is performed in the vertical direction without performing the vertical thinning-out processing, thereby allowing for uniformity of the centroid of pixels in taking a moving image, as can be seen from equal intervals in the vertical direction between adders, indicated by typical signs in FIG. 8 for adding pixels. No thinning-out of pixel information prevents the generation of false-color signals. In addition, since the processing for thinning out pixel information is not performed, no empty packets are produced during vertical transfer, thus preventing the occurrence of smearing.

Now, the operation of the charge controller 13B in the moving-image capturing mode, that is, the horizontal thinning-out and read-out operation, will be described with reference to a timing chart shown in FIG. 9.

Figure 9:
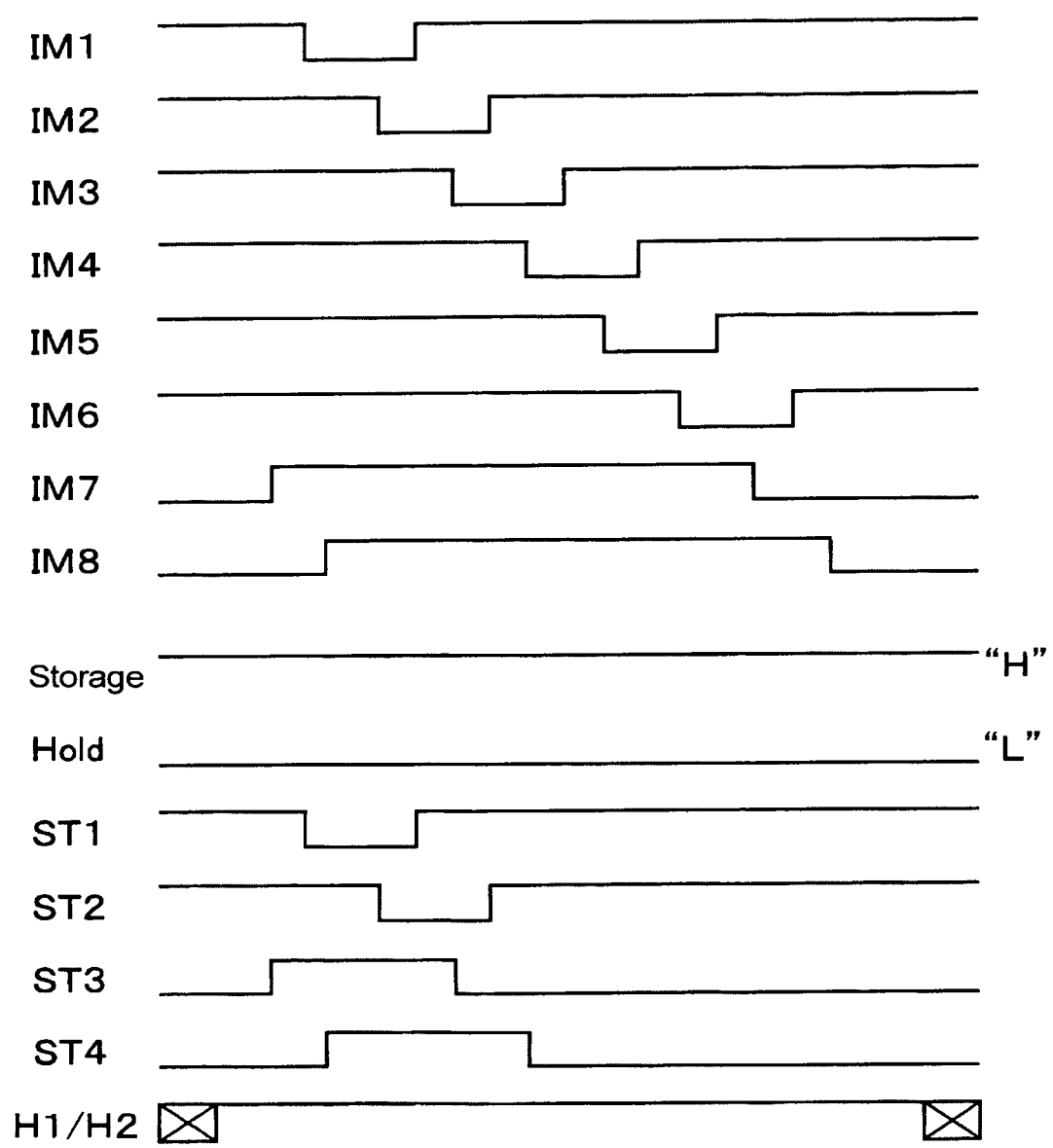
FIG. 9 is a timing chart showing the operation of the charge controller according to the second embodiment in a moving-image capturing mode.

In the timing chart shown in FIG. 9, when the seventh-phase vertical transfer pulse IM7 and then the eighth-phase vertical transfer pulse IM8 are sequentially brought to an "H"

level from an "L" level, the vertical CCDs 112 (112A, 112B, 112C, and 112D) transfer the signal charges of the pixels in the bottom row of the imaging unit 11 to the charge controller 13B. In units of four columns, i.e., the vertical CCDs 112A, 112B, 112C, and 112D, the signal charges of the vertical CCDs 112A and 112D in the first and fourth columns are transferred to the accumulator 12, passing through the charge controller 13B.

The storage pulse Storage is in the "H" level state so that the potential under the storage electrode 135 becomes deep, and the hold pulse Hold is in the "L" level state so that the potential under the hold electrode 136 becomes shallow. Thus, the signal charges of the vertical CCDs 112B and 112C in the second and third columns are accumulated under the storage electrode 135, and a potential barrier produced under the hold electrode 136 stops transferring these signal charges to the accumulator 12. The potential barrier stops transferring not only the signal components (i.e., the signal charges) but also smear components (or smear charges). The accumulated charges over the potential barrier are drained to the drain portion 137 by the following vertical transfer operation.

Accordingly, in a case where horizontal thinning-out and read-out processing is performed in units of four columns, i.e., the vertical CCDs 112A, 112B, 112C, and 112D, the charge controller 13B stops transferring the signal charges of the middle vertical CCDs 112B and 112C, and transmits the signal charges of the side vertical CCDs 112A and 112D so that the transmitted signal charges are temporarily accumulated in the accumulator 12. In the moving-image capturing mode, therefore, the charge controller 13B allows the horizontal thinning-out and read-out processing for thinning out the pixel information (including the smear components) of the two middle columns (i.e., two pixels) and reading out the pixel information for the side columns.

The signal charges that are obtained by the charge controller 13B performing thinning-out to, for example, ½ of the number of horizontal pixels are vertically transferred to the horizontal CCD 14 by the four-phase (ST1 to ST4) driving in the accumulator 12. In the horizontal CCD 14, the signal charges are horizontally transferred by the two-phase (H1 and H2) driving to the charge detecting unit 15. The charge detecting unit 15 converts the signal charges into voltage signals and outputs the converted signals.

In the capturing operation in the moving-image capturing mode, therefore, the horizontal thinning-out and read-out processing is performed, and the number of pixels to be thinned out can arbitrarily be set depending on the number of pixels to be added for vertical pixel addition to prevent the amount of vertical pixel information from being excessively larger than the amount of horizontal image information and to allow the same rate of pixel information in both directions. Therefore, there is a good balance between the horizontal resolution and the vertical resolution of a moving image. In the case of the second embodiment, in association with vertical two-pixel addition for every four pixels, two pixels are thinned out for every four horizontal pixels. The amount of pixel information in the vertical and horizontal directions is therefore reduced to ½.

In particular, the charge controller 13B provided between the imaging unit 11 and the accumulator 12 allows the signal charges of the vertical CCDs 112 in the columns of which pixels are read out, e.g., the vertical CCDs 112A and 112D, to be transmitted and temporarily accumulated in the accumulator 12 before they are transferred to the horizontal CCD 14. No empty packets are produced in the horizontal CCD 14 due to no thinning-out, thus preventing the occurrence of smearing caused by addition of smear components in empty packets. That is, transfer of charges from the vertical CCDs 112B and 112C of which pixels are to be thinned out is stopped to thin out the signal components and the smear components, thus preventing the occurrence of smearing.

In the second embodiment, in color coding based on a primary-color Bayer array having two (horizontal) by two (vertical) pixel patterns, in units of four columns of the vertical CCDs 112, the pixel information for the two middle columns is thinned out while the pixel information for the side columns are read out. However, this is merely an example, and any other form may be used.

The color coding scheme of the color filter is not limited to color coding based on a primary-color Bayer array, and may be color coding based on a primary-color stripe array, a complementary-color lattice array, or the like. The number of columns as a unit of thinning-out and read-out is not limited to four but may be five or more. The columns of which the pixel information is to be thinned out is not limited to two middle columns. The columns of which the pixel information is to be thinned out can be determined depending on the color coding scheme.

Still-Image Capturing Mode

Next, the operation of the charge controller 13B in the still-image capturing mode will be described with reference to a timing chart shown in FIG. 10.

In the second embodiment, the horizontal thinning-out and read-out processing is performed in units of, for example, four columns (i.e., four horizontal pixels). The charge controller 13B performs processing for reading out the signal charges transferred in parallel from the four vertical CCDs 112A, 112B, 112C, and 112D in two blocks. In the still-image capturing mode in which signal charges of all pixels are independently read out, two-line sequence is used in which signal charges of pixels in one row are read out in two blocks.

In the two-line sequence, signal charges of pixels corresponding to ½ of the number of pixels in one row of the imaging unit 11 are sequentially transferred in each-line sequence by the charge controller 13B, the accumulator 14, and the horizontal CCD 12, and are output via the charge detecting unit 15. The total processing time of the two-line sequence is substantially the same as the processing time of a sequence in which signal charges of pixels in one row of the imaging unit 11 are sequentially transferred by the accumulator 12 and the horizontal CCD 14 and are output via the charge detecting unit 15.

Figure 10:
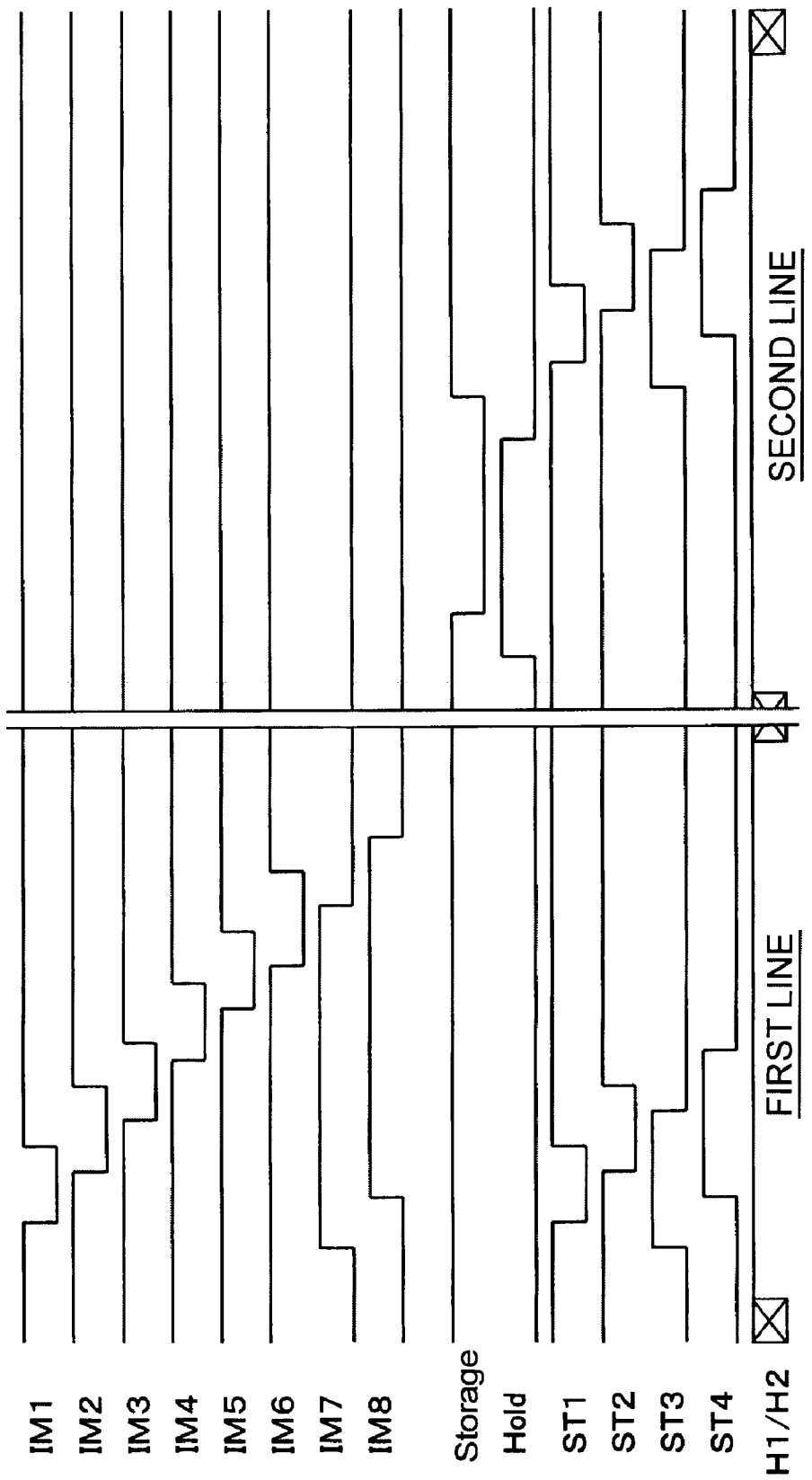
FIG. 10 is a timing chart showing the operation of the charge controller according to the second embodiment in a still-image capturing mode.

In the timing chart shown in FIG. 10, when the seventh-phase vertical transfer pulse IM7 and then the eighth-phase vertical transfer pulse IM8 are sequentially brought to an "H" level from an "L" level, the vertical CCDs 112 (112A, 112B, 112C, and 112D) transfer the signal charges of the pixels in the bottom row of the imaging unit 11 in parallel to the charge controller 13B.

In units of four columns, i.e., the vertical CCDs 112A, 112B, 112C, and 112D, first, the signal charges of the vertical CCDs 112A and 112D in the first and fourth columns are transferred to the accumulator 12, passing through the charge controller 13B. The storage pulse Storage is in the "H" level state so that the potential under the storage electrode 135 becomes deep, and the hold pulse Hold is in the "L" level state so that the potential under the hold electrode 136 becomes shallow. Thus, the signal charges of the vertical CCDs 112B and 112C in the second and third columns are accumulated under the storage electrode 135, and a potential barrier produced under the hold electrode 136 stops transferring charges to the accumulator 12.

The signal charges of the vertical CCDs 112A and 112D in the first and fourth columns transferred to the accumulator 12 through the charge controller 13B are vertically transferred to the horizontal CCD 14 by the four-phase (ST1 to ST4) driving in the accumulator 12. In the horizontal CCD 14, the signal charges are horizontally transferred by the two-phase (H1 and H2) driving to the charge detecting unit 15. The charge detecting unit 15 converts the signal charges into voltage signals and outputs the converted signals. The processing of the first-line sequence is now completed, and then the processing of the second-line sequence is performed.

In the second-line sequence, the hold pulse Hold is brought to the "H" level from the "L" level so that the potential under the hold electrode 136 becomes deep, and the storage pulse Storage is then brought to the "L" level from the "H" level so that the potential under the storage electrode 135 becomes shallow. Thus, the signal charges of the vertical CCDs 112B and 112C in the second and third columns held under the storage electrode 135 are transferred to the accumulator 12, passing through the charge controller 13B.

The signal charges of the vertical CCDs 112B and 112C in the second and third columns transferred to the accumulator 12 through the charge controller 13B are vertically transferred by the accumulator 12 to the horizontal CCD 14. In the horizontal CCD 14, the signal charges are horizontally transferred to the by the charge detecting unit 15. The charge detecting unit 15 converts the signal charges into voltage signals and outputs the converted signals. The processing of the second-line sequence, that is, the processing of the overall two-line sequence, is now completed.

As a result, as discussed above, the charge controller 13B allows the signal charges of four pixels transferred in parallel in units of four vertical CCDs 112 of the imaging unit 11, i.e., the vertical CCDs 112A, 112B, 112C, and 112D, to be read out in two blocks, which are then sequentially transferred to the accumulator 12. The pixel signals output after the two-line sequence are returned to the original pixel array of one row of the imaging unit 11 by the signal processing system in the subsequent stage of the CCD imaging device 10 by rearranging the two-line pixel signals using a line memory or the like.

In the still-image capturing mode, therefore, signal charges transferred in parallel from the imaging unit 11 in units of, for example, four columns (i.e., four horizontal pixels), which are used as a unit of the horizontal thinning-out and read-out processing, are read out in a plurality of blocks (in this example, two blocks) by the charge controller 13B. Even if the charge controller 13B used for the horizontal thinning-out and read-out processing in the moving-image capturing mode is provided between the imaging unit 11 and the accumulator 12, the signal charges of all pixels 111 of the imaging unit 11 can independently be read out by the two-line sequence.

As discussed above, in the FIT-type CCD imaging device 10 including the imaging unit 11 and the accumulator 12, the charge controller 13B according to the second embodiment is provided between the imaging unit 11 and the accumulator 12. In a case where the charge controller 13B performs the horizontal thinning-out and read-out processing in the moving-image capturing mode, the number of pixels to be thinned out in the horizontal direction can arbitrarily be set depending on the number of pixels to be added in the vertical direction (possibly with the thinning-out processing), thereby preventing the amount of horizontal image information from being excessively larger than the amount of vertical pixel information. Thus, there is a good balance between the horizontal resolution and the vertical resolution of a moving image. Along with the reduction in the amount of horizontal image information, the horizontal driving frequency can be reduced.

In the second embodiment, pixel addition without the thinning-out processing is performed in the vertical direction, and no empty packets are produced in the vertical CCDs 112. The charge controller 13B used for the horizontal thinning-out and read-out processing further thins out the signal components and the smear components for the vertical CCD of which pixels are to be thinned out so as not to produce empty packets in the horizontal CCD 14. In the moving-image capturing mode, therefore, the occurrence of smearing caused by thinning-out and read-out can be prevented.

In particular, in the second embodiment, with the use of a combination of the FIT type that is greatly effective as a smear reduction solution and the horizontal thinning-out and read-out method performed by the charge controller 13B according to the second embodiment, in other words, the light-shielded accumulator 12 mounted in the CCD imaging device including the charge controller 13B according to the second embodiment, the occurrence of smearing can greatly be reduced in the video mode in cooperation with the smear reduction effect of the accumulator 12.

In a case of the FIT-type CCD imaging device 10, in the moving-image capturing mode, the charge controller 13B performs the horizontal thinning-out and read-out processing and outputs signal charges to the accumulator 12. In the still-image capturing mode, the charge controller 13B divides the signal charges transferred in parallel from the imaging unit 11 in units of pixels to be subjected to the horizontal thinning-out and read-out processing into a plurality of blocks, and outputs the plurality of blocks of signal charges to the accumulator 12. Therefore, the amount of pixel information in the horizontal direction is reduced (to ½ when the horizontal thinning-out and read-out processing is carried out in units of four horizontal pixels), and the vertical size of the accumulator 12 is reduced to about 20% of the vertical size of the imaging unit 11. The chip size of the CCD imaging device 10 can therefore be reduced in the vertical direction to about 1.2 times the vertical size of the imaging unit 11. The reasons for the size reduction are the same as those in the first embodiment.

Accordingly, with the use of horizontal thinning-out and read-out using the charge controller 13B, the FIT-type CCD imaging device 10 including the charge controller 13B according to the second embodiment allows significant reduction in chip size and also allows significant reduction in cost. The FIT-type CCD imaging device 10 is therefore suitable to mount in a consumer imaging apparatus, e.g., a digital still camera, which is difficult in the related art in view of cost. Moreover, with the ability to significantly reduce the occurrence of smearing in the video mode in cooperation with the smear reduction effect of the FIT type, the image quality can greatly be increased.

APPLICATION EXAMPLES

The FIT-type CCD imaging device 10 including the above-described charge controller 13A or 13B according to the first or second embodiment is suitable to mount as an imaging device in an imaging apparatus (camera module), particularly, a consumer imaging apparatus, e.g., a digital still camera.

Figure 11:
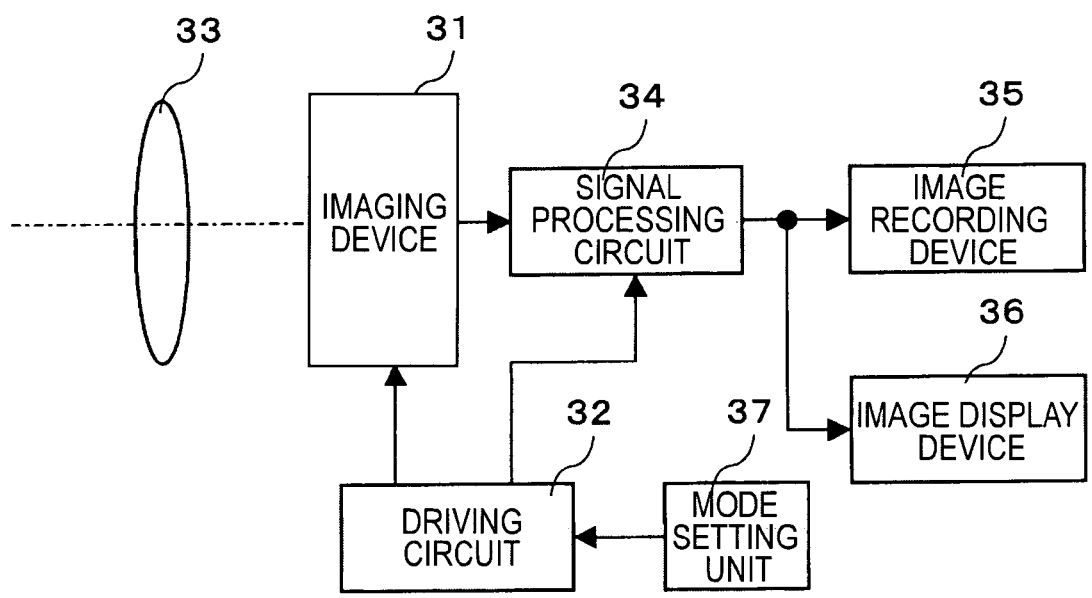
FIG. 11 is a block diagram showing an example configuration of an imaging apparatus according to an embodiment of the present invention.
Figure 12:
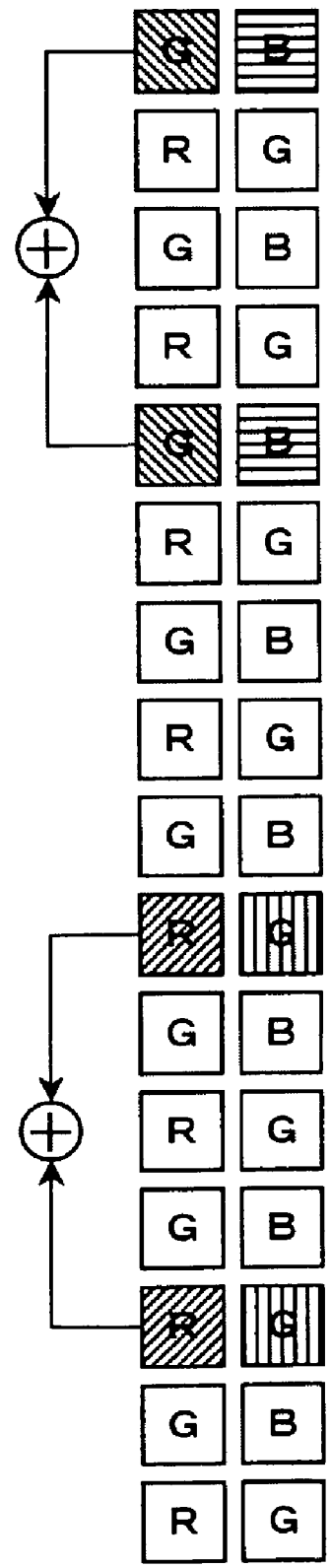
FIG. 12 is a conceptual diagram to illustrate a problem with the related art.
Figure 13:
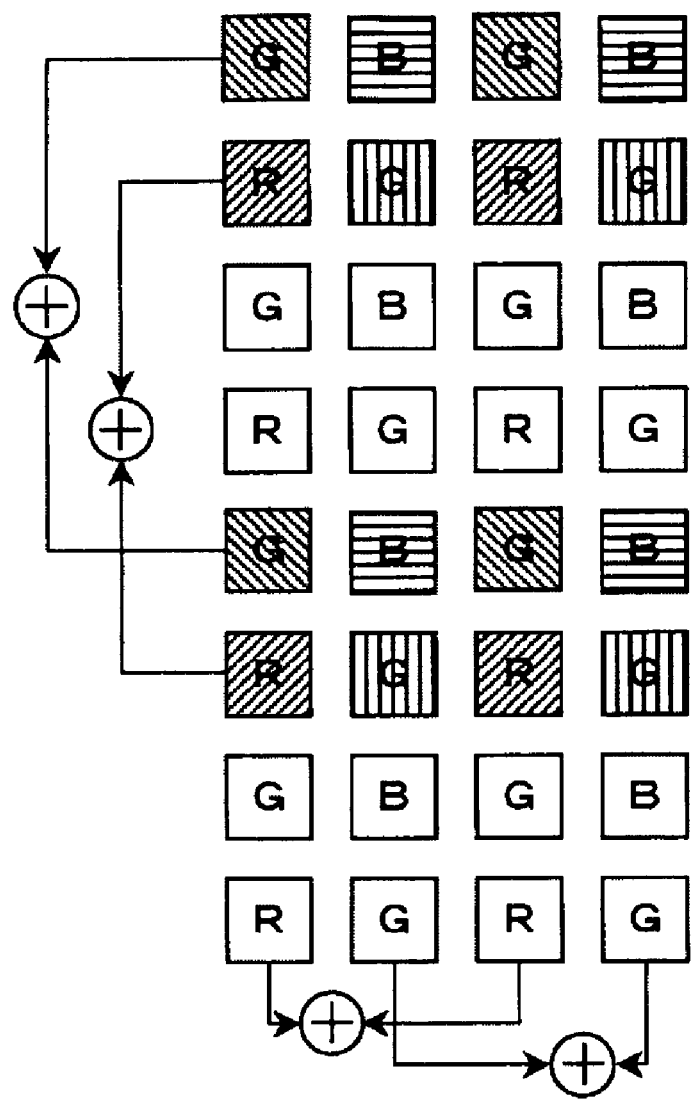
FIG. 13 is a conceptual diagram to illustrate another problem with the related art.

FIG. 11 is a block diagram of an imaging apparatus (e.g., a digital still camera) according to an embodiment of the present invention in which the FIT-type CCD imaging device 10 including the charge controller 13A or 13B according to the first or second embodiment is mounted as an imaging device.

Referring to FIG. 11, the imaging apparatus according to the present embodiment includes an imaging device 31, a driving circuit 32 that drives the imaging device 31, a lens 33 that focuses incident light (image light) from an object (not shown) onto an imaging surface of the imaging device 31, a signal processing circuit 34 that processes an output signal of the imaging device 31, an image recording device 35 that records an image signal processed by the signal processing circuit 34 onto a recording medium, an image display device 36 that displays the image signal processed by the signal processing circuit 34 on a monitor, and a mode setting unit 37 that sets the capturing mode of the imaging device 31.

In the imaging apparatus with the above-described configuration, the imaging device 31 may be the FIT-type CCD imaging device 10 including the above-described charge controller 13A or 13B according to the first or second embodiment. The driving circuit 32 has the function of the timing generator 20 shown in FIG. 1. Incident light (image light) from the object is focused on the imaging surface of the imaging device 31 via an optical system including the lens 33. The mode of the imaging device 31 is set by the user using the mode setting unit 37 between a moving-image capturing mode (a first capturing mode) for capturing a moving image and a still-image capturing mode (a second capturing mode) for capturing a still image.

Figure 4:
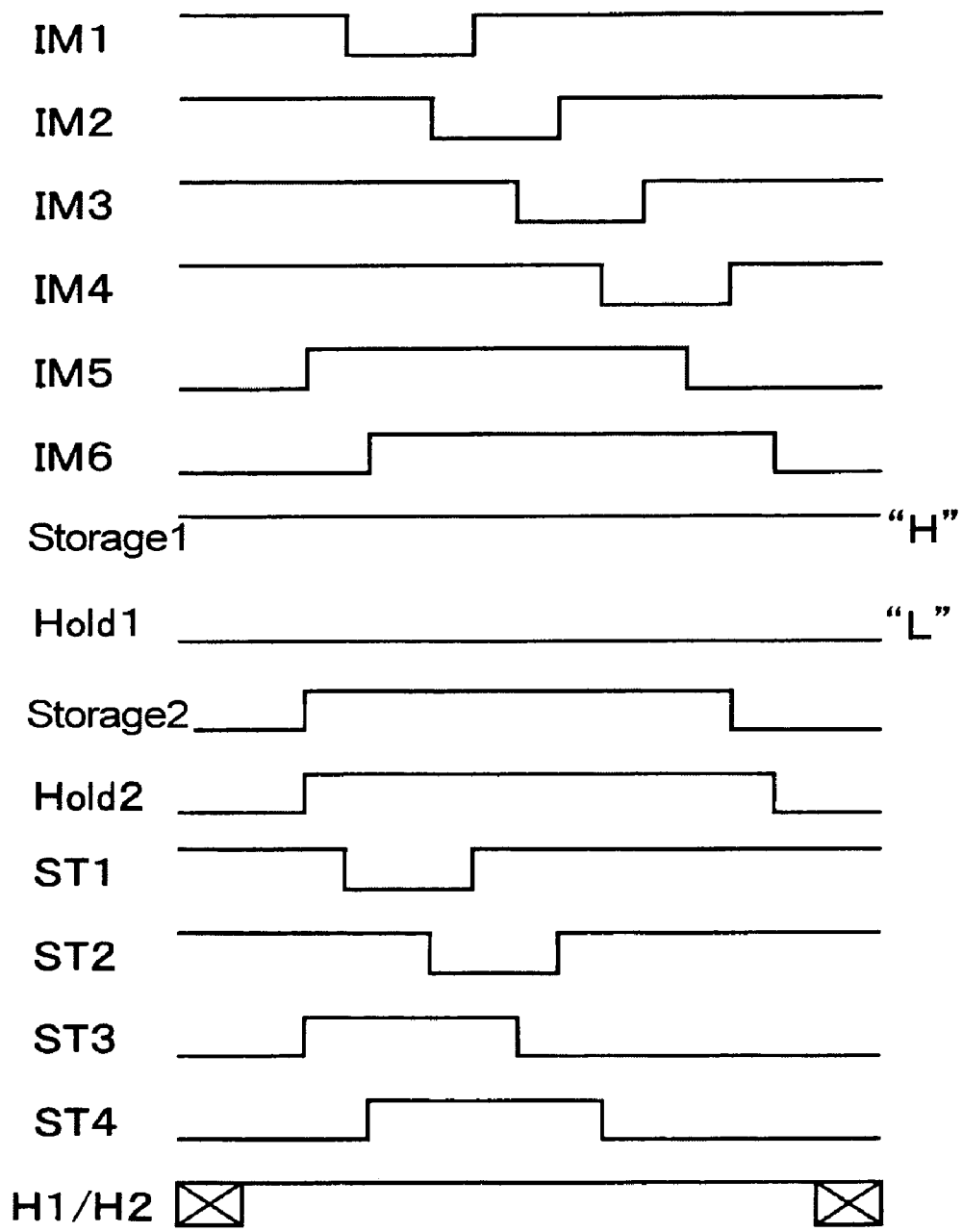
FIG. 4 is a timing chart showing the operation of the charge controller according to the first embodiment in a moving-image capturing mode.

When the moving-image capturing mode (including the monitoring mode) is set by the mode setting unit 36, the driving circuit 32 generates the timing signals at the timing shown in the timing chart of FIG. 4 or 9. When the still-image capturing mode is set by the mode setting unit 36, the driving circuit 32 generates the timing signals at the timing shown in the timing chart of FIG. 6 or 10. The imaging device 31 is driven and controlled by the generated timing signals.

The signal processing circuit 34 performs signal processing on an output signal of the imaging device 31, such as correlated double sampling (CDS) and analog-to-digital (A/D) conversion. In the still-image capturing mode, the signal processing circuit 34 rearranges three-line or two-line pixel signals output by the three-line sequence (the first embodiment) or the two-line sequence (the second embodiment) from the imaging device 31 using, for example, a line memory.

In the still-image capturing mode, the image recording device 35 records the image signal processed by the signal processing circuit onto a recording medium. The image information recorded on the recording medium is hard-copied using a printer or the like. In the moving-image capturing mode, the image display device 35 displays the image signal processed by the signal processing circuit 34 on a display monitor such as a liquid crystal display.

As discussed above, in a case where the FIT-type CCD imaging device 10 (as described in the first embodiment) is mounted as the imaging device 31 in an imaging apparatus such as a digital still camera, the CCD imaging device 10 allows significant reduction of the occurrence of smearing in the video mode and allows reduction in chip size and cost. A low-cost high-quality imaging apparatus with reduction of the occurrence of smearing can therefore be achieved.

In recent imaging apparatuses, such as digital still cameras, demands for higher density cells (or unit pixels) for the purpose of high still image quality have increased, and, due to the characteristics of CCD imaging devices, the higher density cells can increase the occurrence of smearing. It is therefore effective to mount the low-cost CCD imaging device 10 with great reduction of the occurrence of smearing in the video mode as an imaging device, particularly, in such imaging apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
an imaging unit including a plurality of pixels arranged into a matrix for performing photoelectric conversion and a plurality of vertical transfer units arranged in columns for vertically transferring signal charges of the plurality of pixels on a column-by-column basis;
a charge control unit that uses a predetermined number of columns greater than one as a unit in a predetermined operation mode and that, in the predetermined operation mode, performs processing to stop transferring charges from a vertical transfer unit in a predetermined column of the predetermined number of columns and to add the signal charges transferred from the vertical transfer units in the remaining columns of the predetermined number of columns to output the added signal charges; and
a horizontal transfer unit that horizontally transfers the signal charges output from the charge control unit, wherein,
in another operation mode different from the predetermined operation mode, the charge control unit performs processing to convert signal charges transferred in parallel from the plurality of vertical transfer units in units of the predetermined number of columns into serially arranged signal charges and to sequentially output the serially arranged signal charges,
the charge control unit is provided with a charge holding unit for holding the signal charges transferred from the plurality of vertical transfer units on a column-by-column basis in units of the predetermined number of columns, and releases the signal charges held in the charge holding unit on a column-by-column basis, and
the charge control unit is not provided with the charge holding unit for one of the predetermined number of columns.

2. The solid-state imaging device according to claim 1, wherein, with respect to the predetermined column, the charge control unit drains the signal charges held in the charge holding unit to a charge drain unit.

3. The solid-state imaging device according to claim 1, further comprising an accumulation unit between the charge control unit and the horizontal transfer unit for temporarily accumulating the signal charges output from the charge control unit.

4. A solid-state imaging device comprising:
an imaging unit including a plurality of pixels arranged into a matrix for performing photoelectric conversion and a plurality of vertical transfer units arranged in columns for vertically transferring signal charges of the plurality of pixels on a column-by-column basis;
a charge control unit that uses a predetermined number of columns greater than one as a unit in a predetermined operation mode and that, in the predetermined operation mode, performs processing to stop transferring charges from a vertical transfer unit in a predetermined column of the predetermined number of columns and to add the signal charges transferred from the vertical transfer units in the remaining columns of the predetermined number of columns to output the added signal charges;
a horizontal transfer unit that horizontally transfers the signal charges output from the charge control unit; and an accumulation unit between the charge control unit and the horizontal transfer unit for temporarily accumulating the signal charges output from the charge control unit, wherein, the accumulation unit is provided in units of the predetermined number of columns.

5. A solid-state imaging device comprising:

an imaging unit including a plurality of pixels arranged into a matrix for performing photoelectric conversion and a plurality of vertical transfer units arranged in columns for vertically transferring signal charges of the plurality of pixels on a column-by-column basis;

a charge control unit that uses a predetermined number of columns greater than one as a unit in a predetermined operation mode and that, in the predetermined operation mode, performs processing to stop transferring charges from a vertical transfer unit in a predetermined column of the predetermined number of columns and to transmit the signal charges transferred from the vertical transfer units in the remaining columns of the predetermined number of columns; and an accumulation unit that temporarily accumulates the signal charges output from the charge control unit; and a horizontal transfer unit that horizontally transfers the signal charges output from the accumulation unit, wherein, the accumulation unit is provided in units of the predetermined number of columns.

6. The solid-state imaging device according to claim 5, wherein, in another operation mode different from the predetermined operation mode, the charge control unit performs processing to sequentially output a plurality of blocks of signal charges transferred in parallel from the plurality of vertical transfer units in units of the predetermined number of columns.

7. The solid-state imaging device according to claim 5, wherein the charge control unit is provided with a charge holding unit for holding the signal charges transferred from the vertical transfer unit in the predetermined column on a column-by-column basis.

8. The solid-state imaging device according to claim 7, wherein, with respect to the predetermined column, the charge control unit drains the signal charges held in the charge holding unit to a charge drain unit.

* * * * *